July 26, 1966   L. J. O'BRIEN   3,262,512
FOUR WHEEL DRIVE

Filed July 23, 1962   3 Sheets-Sheet 1

July 26, 1966 L. J. O'BRIEN 3,262,512
FOUR WHEEL DRIVE

Filed July 23, 1962 3 Sheets-Sheet 3

United States Patent Office 3,262,512
Patented July 26, 1966

3,262,512
FOUR WHEEL DRIVE
Loren J. O'Brien, Grabill, Ind., assignor to Dana Corporation, Toledo, Ohio, a corporation of Virginia
Filed July 23, 1962, Ser. No. 211,608
6 Claims. (Cl. 180—44)

This invention relates to four wheel drives in general and more specifically to a four wheel drive unit including means for individually imparting drive to the wheels of one axle while imparting drive simultaneously to the other axle.

Four wheel drive units are old in the art and were evolved primarily to provide a greater tractive effort for a vehicle for use when operating under certain conditions such as on slippery or soft roads. With the four wheel drive, the power of the prime mover may be transmitted simultaneously to a pair of driving axles rather than, as in the conventional drive, to the rear axle only.

With the conventional four wheel drive units, the power to the front wheels is transmitted from the four wheel drive unit to a differential unit carried by the front axle and then simultaneously to both front wheels. This type of drive is disadvantageous, since in supplying such a front driving axle to a vehicle of standard design, it is necessary to raise the complete vehicle or make major changes therein to accommodate the driving axle; the main problem being that the front axle and the prime mover ideally should be located in approximately the same position and therefore one or both of them must be displaced from the ideal location to accommodate the other. Additionally, it has been very difficult to provide an independent suspension for the front wheels of the conventional four wheel drive vehicle, and when such an individual front suspension was desired it generally has required a complete redesign of the conventional vehicle.

Therefore, this invention is more particularly directed to a four wheel drive unit adapted to receive power from the prime mover through a drive arrangement, including a suitable transmission, and transmit the power to the rear axle and selectively, simultaneously, differentially, and individually transmit power to the front wheels of the vehicle. The prior art, such as in Patents Nos. 1,229,971 and 1,476,413, includes such drive units adapted to transmit power individually to the front wheels; however, these drive units have a somewhat standard differential therein including a driving pinion or worm gear and ring gear to drive the differential carrier which in turn through suitable gear means drives the front wheels, and separate shafts for mounting the differential unit and transmitting power through the unit to the rear axle. Further, the driving means from the four wheel drive unit to the front wheels must rotate in opposite or reverse directions to drive the front wheels in the proper relationship relative to each other and to the rear wheels. The above discussed prior art units accomplish this reversal of transmitted power by means, in addition to the differential, which results in a multitude of parts and large cumbersome units.

It is therefore an object of this invention to provide a four wheel drive unit adapted to transmit power from a prime mover to a rear axle of a vehicle and simultaneously and differentially transmit the power to the front wheels of the vehicle individually.

It is also an object of this invention to provide a four wheel drive unit wherein the means for differentially transmitting power to the front wheels does not include the usual input drive pinion and ring gear.

It is a further object of this invention to incorporate differential means in a four wheel drive unit for individually driving the front wheels of a vehicle wherein the input power to the differential unit is received by one of the side gears and the output from the differential unit is taken from the compensating gear carrier and other side gear so that the usual input drive pinion and ring gear are eliminated and the reversal of power to the front wheels is accommodated by the differential itself.

It is another object of this invention to provide such a unit wherein the differential is mounted on the through shaft which supplies power to the rear axle so that the same are mounted in an in-line relationship.

It is another object of this invention to provide an inexpensive, remotely operable clutch incorporated in the above vehicle drive arrangement at the wheel hub (to permit free wheeling) so that the driving mechanism can be selectively disconnected at the wheel hub to prevent noise, drag, etc. which is common when the wheels of the vehicle are driving, such as when the vehicle is coasting.

It is a still further object of this invention to provide such a four wheel drive unit which is highly compact, has a reduced number of parts, is easily and inexpensively manufactured, and yet durable in use.

Other and further objects of this invention will become apparent from a consideration of the specification when taken in conjunction with the drawings wherein.

Figure 1:
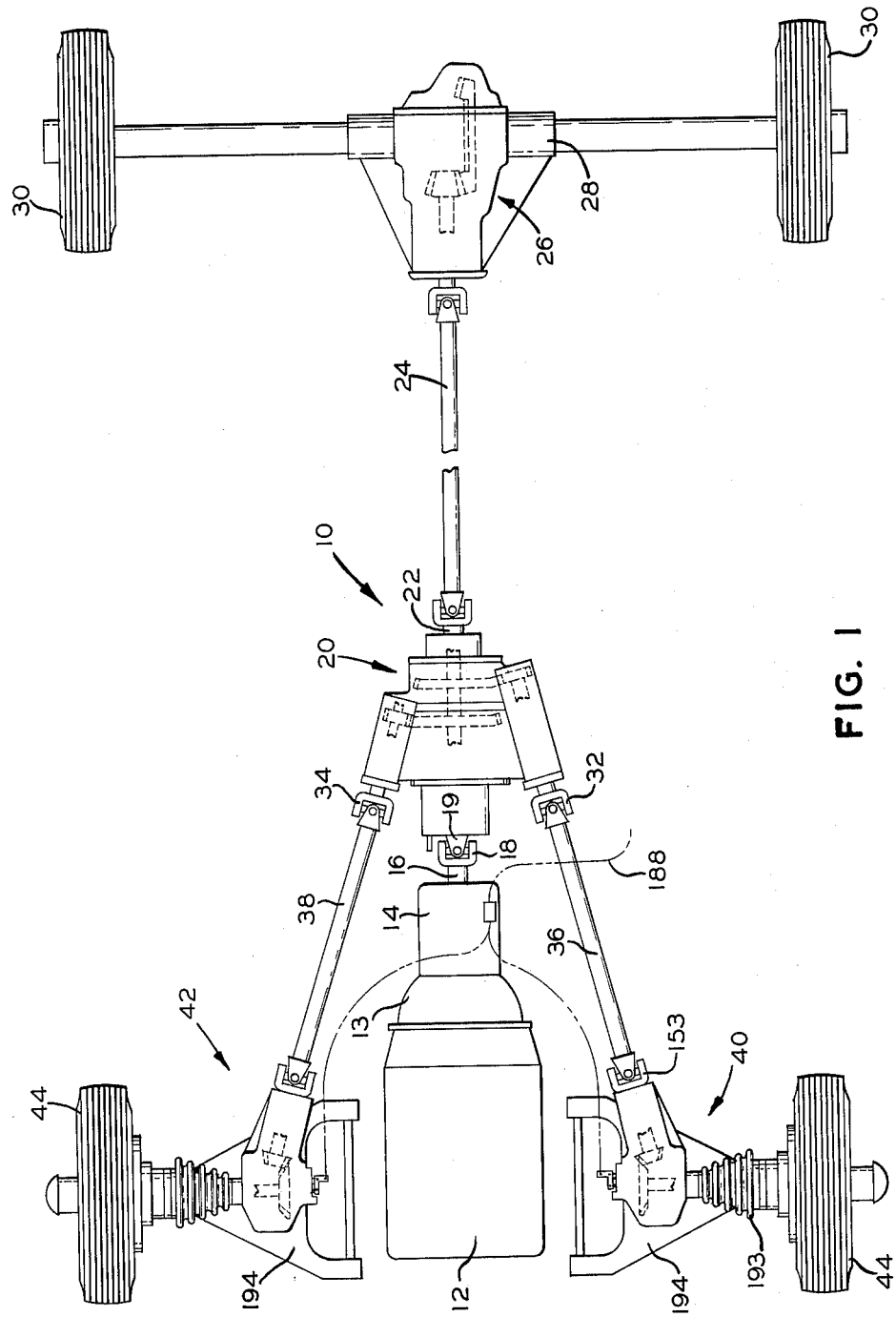
FIG. 1 is a somewhat schematic plan view of a vehicle prime mover and the drive arrangement for a vehicle including a four wheel drive unit embodying this invention.

Referring now to the drawings, a vehicle propelling system shown generally at 10 includes a prime mover 12 drivingly connected through a clutch 13 to the usual transmission 14. The transmission 14 is provided with an output shaft 16 joined by a universal means shown generally at 18 to an input connection in the form of an end yoke 19 of a four wheel drive unit 20. If desired, the transmission 14 can be directly coupled to the unit 20 with the universal means 18 and the end yoke 19 eliminated.

The four wheel drive unit 20 has a rearwardly extending output connection in the form of an end yoke 22 which is joined by the usual propeller shaft assembly and universal means 24 to the differential 26 of a rear axle 28 and therethrough to a pair of ground wheels 30. The four wheel drive unit 20 is also provided with a first and a second forwardly extending output connection in the form of end yokes 32 and 34 respectively, which yokes are drivingly connected by propeller shaft assemblies 36 and 38 to the half axle assemblies 40 and 42 respectively to drive a pair of ground wheels 44.

Figure 2:
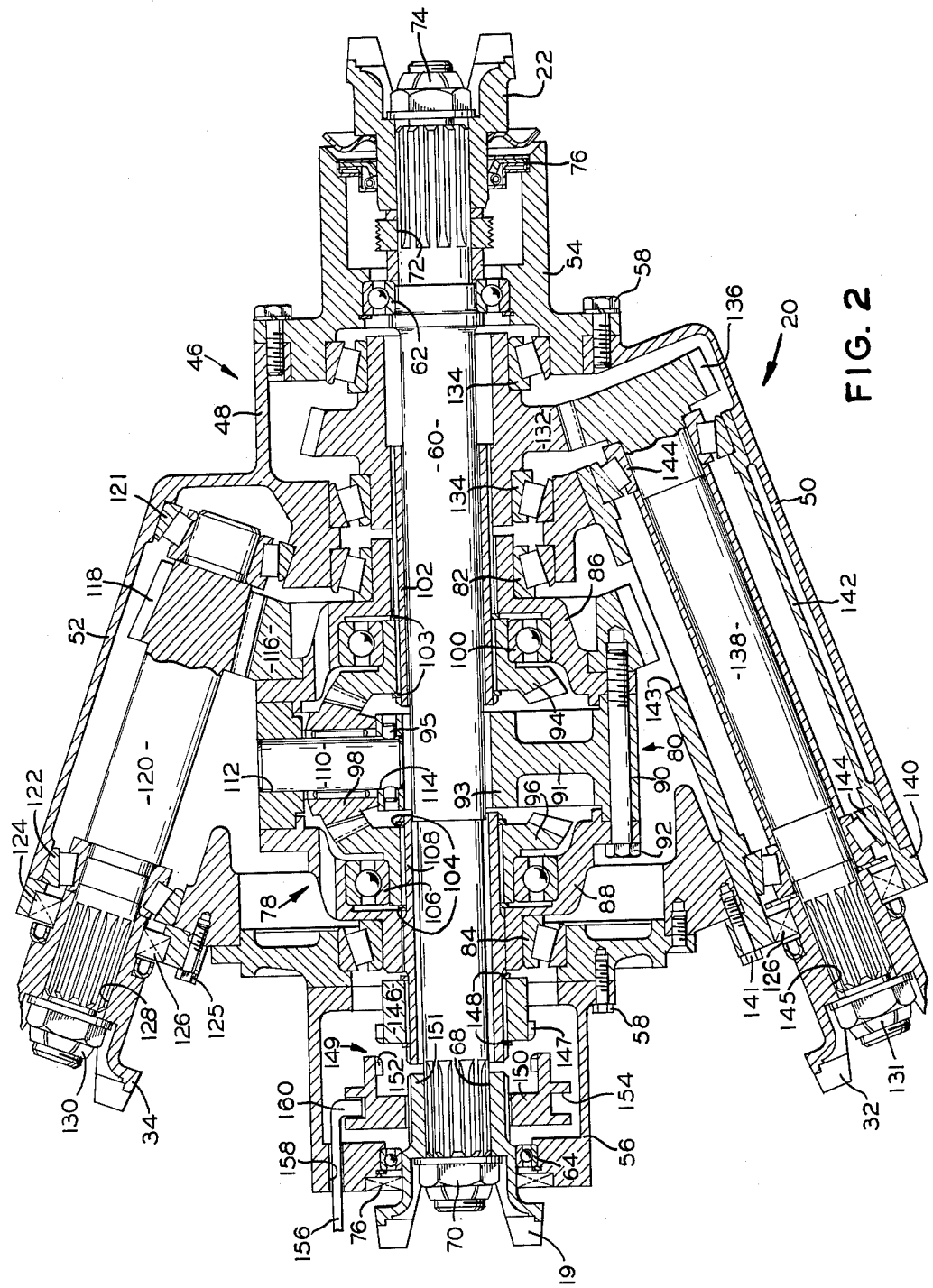
FIG. 2 is a plan view in section of the four wheel drive unit shown in FIG. 1.

Referring to FIG. 2, wherein the components of the four wheel drive unit 20 are shown in greater detail, the unit 20 includes a main case 46 comprising a substantially annular longitudinally extending portion 48 and a pair of laterally spaced portions 50 and 52 formed integrally therewith and extending angularly therefrom in a forward direction. The longitudinally extending portion 48 is provided with a pair of end covers 54 and 56 suitably secured thereto as by a plurality of bolts 58.

A through shaft 60 is rotatably mounted in the longitudinal portion 48 of the case 46 by means of the bearing 62 interposed between the cover 54 and the shaft 60 and the bearing 64 interposed between the cover 56 and the end yoke 19. The forward end of the through shaft 60 is drivingly connected to the end yoke 19 by means of a spline engagement shown generally at 68 and suitably secured thereto as by a lock nut 70 threadedly carried by the end of the shaft 60. The rearward end of the through shaft 60 is drivingly connected to the rearwardly extending output connection in the form of the end yoke 22 by means of a spline engagement shown generally at 72 and suitably secured thereto as by a lock nut 74 threadedly carried by the through shaft 60. Interposed between the covers 54 and 56 and the end yokes 22 and 19 respectively are separate sealing means shown generally at 76 to prevent the escape of lubricant from the four wheel drive unit.

Rotatably disposed on the through shaft 60 is a differential unit shown generally at 78, which unit includes a differential case 80 rotatably mounted in the main case 46 by means of the bearings 82 and 84 interposed therebetween. The differential case 80 is of three piece construction; a pair of end covers 86 and 88 and a central member 90 fixedly interconnected by means of a plurality of bolts 92, and carries the differential gear train consisting of a pair of side gears 94 and 96 and a plurality of pinion or compensating gears one of which is shown at 98. The central member 90 has a plurality of integral, circumferentially spaced arms 91 extending radially inwardly therefrom to an integrally formed sleeve 93 disposed about and spaced from the through shaft 60.

The side gear 94 is rotatably mounted in the end cover 86 by means of a bearing 100 and is splined for unitary rotation to a first side gear extension in the form of a sleeve 102 which extends rearwardly therefrom between and spaced from the cover 86 and the through shaft 60. A pair of snap rings 103 are carried by the extension 102 and abuttingly engage the opposite longitudinal ends of the side gear 94 to prevent relative longitudinal movement therebetween.

The side gear 96 is rotatably mounted in the end cover 88 by means of a bearing 106 and is splined for unitary rotation to a second side gear extension in the form of a sleeve 108 which extends forwardly therefrom between and spaced from the cover 88 and the through shaft 60. A pair of snap rings 104 are carried by the extension 108 and abuttingly engage the opposite longitudinal ends of the side gear 96 to prevent relative longitudinal movement therebetween.

The pinion gears 98 are each rotatably mounted on a driving pin one of which is shown at 110, which driving pins are carried in radially aligned openings 112 and 114 in the center member and sleeve 90 and 93 respectively of the differential case 80 and secured thereto by means of a lock pin 95 pressed into aligned openings in the driving pin 110 and sleeve 93. The pins 110 and pinion gears 98 are positioned between the circumferentially spaced arms 91 so that the arms do not interfere with the function of the pinion gears.

A first output gear 116 is suitably secured to the rearward end of the differential case 80 as by means of the bolts 92 and is meshed with a gear 118 formed integrally with a forwardly extending output shaft 120. The shaft 120 is rotatably mounted in the lateral portion 52 of the main case 46 by means of a pair of bearings 121 and 122 and extends forwardly therefrom. The forward end of the case portion 52 has a bearing cap 124 secured thereto as by a plurality of bolts 125, which cap carries a sealing means 126 interposed between the same and the end yoke 34. The end yoke 34 is drivingly connected to the output shaft 120 by means of the spline engagement shown generally at 128 and secured thereto by means of a lock nut 130 threadedly carried by the shaft 120.

A second output gear 132 is splined for unitary rotation to the rearward end of the side gear extension 102 and rotatably mounted in the case 46 by means of a pair of bearings 134. The output gear 132 is meshed with a gear 136 formed integrally with another forwardly extending output shaft 138 disposed in the lateral portion 50 of the case 46 with the forward end thereof extending from the portion 50. A bearing cap 140 is secured to the open end of a lateral portion 50 by a plurality of bolts 141 and has an annular extension 142 projecting inwardly therefrom in a pressed fit relationship with the inner walls of the portion 50. Interposed between the extension 142 and the second output shaft 138 is a pair of bearings 144 which rotatably mount the shaft 138 relative to the lateral portion 50 of the case 46. The end yoke 32 is drivingly connected to the forward end of the output shaft 138 by means of the spline engagement shown generally at 145 and secured thereto by means of a lock nut 131 threadedly carried by the shaft 138.

At the location of the output gear 116, the extension 142 is provided with an opening 143 to accommodate the periphery of the gear 116 and to allow lubricant to be splashed into the extension 142 to reach the bearings 144. A sealing means 126 is disposed between the cap 140 and the sleeve yoke 32 to prevent the escape of lubricant therebetween.

Clutch means shown generally at 149 are provided to selectively couple the side gear 96 to the input connection 19 of the four wheel drive unit 20. More particularly, a clutch gear 146 having external clutching teeth 147 is splined for unitary rotation to the end of the side gear extension 108 projecting forwardly from the differential case 80 and secured thereto by a pair of snap rings 148 carried by the extension 108 and abutting the gear 146. A clutch collar 150 is splined for unitary rotation on the rearwardly extending barrel portion 151 of the end yoke 19 carried by the through shaft 60 and adapted to slide longitudinally thereon. The collar 150 is provided with internal clutching teeth 152 operable to clutchingly engage the external clutching teeth 147 of the gear 146 and a shifting slot 154 extending circumferentially about the periphery thereof. A shift rod 156 is slidably received in an opening 158 in the forward end of the cover 56 and has a portion 160 extending therefrom into the slot 154 so that forward and rearward movement of the rod 156 results in corresponding movement of the clutch collar 150. Rearward movement of the collar 150 clutchingly engages the teeth 152 and 147 of the collar and gear 150 and 146 respectively, thereby drivingly connecting the yoke 19 and the shaft 60 to the side gear extension and side gear 108 and 96, while forward movement of the collar 150 disengages the collar and gear 150 and 146 thereby disconnecting the side gear 96 from the shaft 60.

Figure 3:
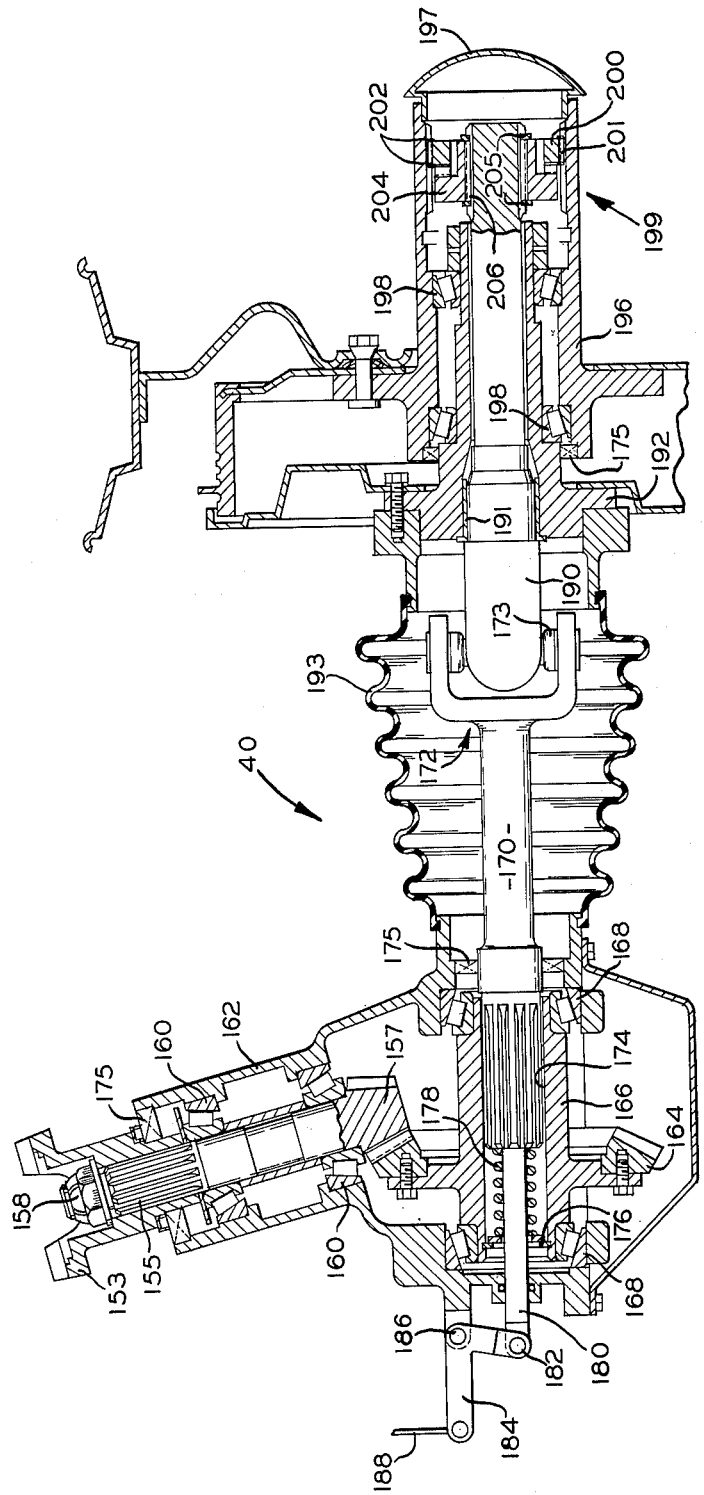
FIG. 3 is a plan view in section of the individual driving arrangement for one of the front wheels shown in FIG. 1.

Referring now to FIG. 3, half axle assembly 40 is shown in detail with the following reference to the structure thereof equally applicable to the half axle 42 which is identical thereto although reversed in lateral positioning. The propeller shaft assembly 36, which is universally connected to the end yoke 32, is also universally connected at its forward end to an end yoke 153, which yoke 153 is splined on the rearward end of the shaft portion 155 of a pinion gear 157 and suitably secured thereto as by a lock nut 158 threadedly carried by the end of the shaft. The shaft 155 of the pinion gear 157 is rotatably mounted by means of a pair of bearings 160 in an angle drive case 162. A ring gear 164 is meshed with the pinion gear 157 and fixedly attached to a tubular shaft 166 rotatably mounted in the angle drive case 162 by means of a pair of bearings 168.

An inboard portion 170 of a drive shaft 172 has the inner end thereof splined in the tubular shaft 166, as at 174, for unitary rotation therewith and telescopic movement therein. Separate sealing means shown generally at 175 are interposed between the case 162 and the shaft portion 170 and the end yoke 153 to prevent the escape of lubricant therebetween. Positioned between the inner end of the shaft portion 170 and a snap ring 176 carried by the tubular shaft 166 is a compression spring 178 which constantly biases the shaft portion laterally out of the tubular shaft. Slidably received in a case 162 is a shift rod 180 with the laterally outer end thereof carried by the inner end of the shaft portion 170 for relative rotative and unitary lateral movement therewith. The lateral inner end of the shift rod 180 is pivotally secured at 182 to a bell crank mechanism 184, which crank is pivotally attached at 186 to the case 162. The bell crank 184 is secured to a branch of a control cable 188 which cable is adapted to alternately pull the crank clockwise about the pivot 186 thereby pulling the shift rod 180 and the shaft 172 laterally inwardly against the bias of the spring 178 and release the bell crank so that the same may move counterclockwise while the spring 178 biases the shaft 172 and shift rod 180 outwardly.

The drive shaft 172 has an outboard portion 190 universally connected at 173 to the inboard portion 170. The shaft portion 190 is rotatably received in a bushing 191 pressed into the opening defined by an elongated sleeve 192, which sleeve and the angle drive case 162 are secured by means (not shown) to a portion of the vehicle suspension 194 in a non-rotatable manner. The universal connection 173 in the shaft 172 is provided so that the sleeve 192 may be pivoted relative to the case 162 for steering purposes in a well known manner. A wheel hub 196 is rotatably mounted on the sleeve 192 by means of a pair of bearings 198 and has a sealing cap 197 pressed into the outer end thereof. A boot 193 is carried by the inboard end of the sleeve 192 and the outboard end of the case 162 in a surrounding relationship relative to the shaft 172 to protect the same from the elements, and a lubricant sealing means 175 is disposed between the hub 196 and the sleeve 192 to prevent the escape of lubricant therebetween.

Clutch means, shown generally at 199, are provided for the selective coupling of the shaft 172 and the hub 196. More particularly, a bored clutch gear 200 is mounted within the hub 196 for unitary rotation therewith by the splined engagement shown at 201 and secured against lateral movement relative thereto by a pair of snap rings 202 carried by the hub 196 and engaging laterally opposed faces of the gear. The outboard end of the shaft portion 190 extends within, and is spaced from, the bore of the clutch gear 200 and has a clutching gear 204 splined thereon at 206 for unitary rotation therewith and is secured against lateral movement relative thereto by a pair of snap rings 205 carried by the shaft 190 at a position laterally inwardly relative to the clutch gear 200. Accordingly, when the spring 178 biases the drive shaft laterally outwardly, the clutching gear 204 secured thereto drivingly engages the clutch gear 200 secured to the hub 196 and the shaft 172 is operative to drive the wheel 44. When the bell crank 184 pulls the shaft 172 laterally inwardly, the gears 200 and 204 are disengaged and the shaft 172 is inoperative to drive the wheels 44.

The control cable 188 and the shift rod 156, for actuating the clutch means 149 and 199, are supplied with suitable extension and actuation means (not shown) preferably within easy access of the vehicle operator. These last mentioned means can be arranged so that the clutch means can be simultaneously or independently engaged and disengaged.

OPERATION

When the drive to the front wheels 44 is not desired, the clutch means 149 is disengaged, as shown in FIG. 2, with the clutching gear 150 in its longitudinally forward position in spaced relationship relative to the clutch gear 147. The torque transfer from the transmission 14 is carried by the end yoke 19, the through shaft 60 freely rotatable within the differential unit 78, the end yoke 22, propeller shaft 24 and through the differential 26 of the rear axle 28 to the ground wheels 30. The drive between the output of the transmission 14 and the rearward output connection 22 of the four wheel drive unit 20 is preferably of a continuous nature as shown and not selectable by the operator; however, additional clutch means may be incorporated in the four wheel drive unit for selectable through shaft drive. When the clutch 149 is disengaged the clutches 199 in the half axle assemblies 40 and 42 are normally disengaged so that the wheels 44 may freewheel and not drive back to the driving mechanism associated therewith.

If the front wheel drive is desired, the clutch means 149 is engaged by the movement of the clutch shift rod 156 rearwardly which carries the clutching gear 150 rearwardly to engage the teeth 147 and 152, thereby drivingly connecting the input end yoke 19 with the side gear extension 108 and the side gear 96. Accordingly, the side gear 96 acts as the input gear for differential unit 78 and, as is well known in the art, the same will drive the case 80 and the side gear 94, and the output shafts 120 and 138 in opposite directions as required for an independent front wheel drive.

The output shafts 120 and 138 in turn respectively drive the forward output shafts 36 and 38, the pinion and ring gears 157 and 164, and the shaft 172 of the half axles 40 and 42. The clutch means 199 of the half axle assemblies 40 and 42 must also be engaged so that the axle shafts 172 are operative to drive the ground wheels 44. Any differential requirements in the drive to the front wheels 44, as in cornering or slipping, will be accommodated by the differential 78.

From the foregoing, it is apparent that a four wheel drive unit has been described which is adapted to transmit torque from a prime mover to a rear axle of a vehicle and simultaneously, differentially, and independently transmit torque to the front wheels of the vehicle; which unit does not include the usual input drive pinion and ring gear; which incorporates a differential unit wherein the input torque thereto is received by one of the side gears and the output from the differential is taken from the compensating gear carrier and the other side gear so that reversal of torque to the front wheels is accomplished by the differential itself; wherein the differential is mounted on the through shaft which supplies power to the rear axle; and which is compact, has a reduced number of parts, and is easily and inexpensively manufactured, yet durable in service.

While only a single embodiment of this invention has been shown and described, it is apparent that many variations can be made in the structure thereof without departing from the underlying concept of this invention as defined by the appended claims.

What is claimed is:
1. A drive unit for use with a prime mover comprising in combination,
 (1) a housing,
 (2) a through shaft extending inwardly from the forward end of said housing and outwardly from the rearward end of said housing and being mounted in said housing for rotation about its axis and transmitting torque from the prime mover,
 (3) a first and a second drive shaft mounted in said housing in a spaced relationship with each other and said through shaft for rotation in opposite directions about separate axes spaced from said through shaft axis and being operative to independently and simultaneously transmit torque,
 (4) and means operative to transmit torque to said drive shafts including at least a differential unit comprising a gear carrier, compensating gearing carried by said carrier, and a pair of opposed side gears,
 (5) said gear carrier and said side gears being disposed in said housing for co-axial rotation about said through shaft,
 (6) means for connecting one of said side gears for unitary rotation with said through shaft,
 (7) means drivingly connecting the other of said side gears to one of said drive shafts,
 (8) and means drivingly connecting said compensating gear carrier to the other of said drive shafts,
 (9) whereby said differential gear unit is operative to transmit torque to said drive shafts from said prime mover independently, simultaneously, differentially, and in opposite directions.

2. A drive unit for a vehicle having a prime mover and a plurality of wheel driving means comprising in combination,
(1) a housing,
(2) a through shaft rotatably mounted in said housing and being operative to transmit torque from the prime mover to one wheel driving means,
(3) a first and a second drive shaft rotatably mounted in said housing and each being operative to independently transmit torque to another of the wheel driving means,
(4) and a differential gear unit including compensating gearing, a carrier for said compensating gearing, and a pair of side gears,
(5) said compensating gear carrier and said side gears being disposed in said housing for rotation about said through shaft,
(6) means for operatively connecting one of said side gears for unitary rotation with said through shaft,
(7) means drivingly connecting the other of said side gears to one of said drive shafts,
(8) and means drivingly connecting said compensating gear carrier to the other of said drive shafts,
(9) whereby said differential gear unit is operative to independently, simultaneously, and differentially transmit torque from the prime mover to said first and second drive shafts.

3. A four wheel drive unit for a vehicle having a prime mover adapted to drive a first and a second axle each having a pair of ground engaging means with the ground engaging means of the second axle having independent driving means, comprising in combination,
(1) a housing,
(2) a through shaft rotatably mounted in said housing and operative to transmit torque from the prime mover to the driving means of the first axle,
(3) a first and a second drive shaft each being operative to independently transmit torque to one of the independent driving means of the ground engaging means of the second axle,
(4) and a differential gear unit disposed in said housing and including a pair of side gears, compensating gearing, and a compensating gear carrier,
(5) said side gears and said gear carrier being coaxially rotatable about said through shaft,
(6) means for operatively connecting one of said side gears to said through shaft,
(7) means drivingly connecting the other of said side gears to one of said drive shafts,
(8) and means drivingly connecting said compensating gear carrier to the other of said drive shafts,
(9) whereby said differential unit independently, selectively and simultaneously transmit torque to said drive shafts in opposite directions.

4. A four wheel dirve unit for a vehicle having a prime mover adapted to drive a first and a second axle each having a pair of ground engaging means with the ground engaging means of the second axle having independent driving means, comprising in combination,
(1) a housing,
(2) a through shaft rotatably mounted in said housing and being operative to transmit torque from the prime mover to the driving means of the first axle,
(3) a first and a second drive shaft each being operative to independently transmit torque to one of the independent driving means of the ground engaging means of the second axle,
(4) and a differential gear unit disposed in said housing and including a pair of side gears, compensating gearing, and a compensating gear carrier,
(5) said side gears and said compensating gear carrier being co-axially rotatable about said through shaft,
(6) means including a clutch for connecting one of said side gears to said through shaft,
(7) separate gear means for drivingly connecting the other of said side gears to one of said drive shafts and said compensating gear carrier to the other of said drive shafts,
(8) whereby said differential unit independently, selectively and simultaneously transmit torque to said drive shafts in opposite directions.

5. A four wheel drive unit for a vehicle having a prime mover adapted to drive a first and a second axle each having a pair of ground engaging means with the ground engaging means of the second axle having independent driving means, comprising in combination,
(1) a housing,
(2) a rearwardly extending through shaft rotatably mounted in said housing and being operative to transmit torque from the prime mover to the driving means of the first axle,
(3) a pair of forwardly extending drive shafts rotatably mounted in said housing and disposed angularly with respect to said through shaft and being operative to independently transmit torque to the driving means of the second axle,
(4) and means operative to transmit torque from the prime mover to said drive shafts including a differential unit comprising a gear carrier, compensating gearing carried by said carrier, and a pair of opposed side gears,
(5) said gear carrier and said side gears being disposed in said housing for co-axial rotation about said through shaft,
(6) means including a clutch for operatively connecting one of said side gears to said through shaft,
(7) angle drive gear means drivingly connecting the other of said side gears to said one of said drive shafts,
(8) and angle drive gear means drivingly connecting said compensating gear carrier to the other of said drive shafts,
(9) whereby said differential gear unit is operative to transmit torque to said drive shafts from said prime mover independently, simultaneously, differentially, and in opposite directions simultaneously with the transmission of torque by said through shaft to the first axle.

6. A vehicle drive arrangement comprising in combination,
(1) a first and a second axle each having a pair of ground wheels,
(2) a through shaft operatively connected to said first axle,
(3) a prime mover operatively connected to said through shaft for effecting driving movement of said first axle,
(4) independent driving means for each of the ground engaging wheels of said second axle,
  (a) including a first and a second drive shaft means each adapted to be operatively connected to its respective ground engaging wheel,
(5) means including a differential unit co-axial with said first axle driving shaft and operatively connected to said first and second drive shaft means,
  (a) said differential unit comprising a gear carrier, compensating gearing carried by said carrier, and a pair of opposed side gears,
(6) first clutch means for drivingly connecting one of said side gears to said through shaft,
(7) means drivingly connecting the other of said side gears to one of said drive shaft means,
(8) and means drivingly connecting said gear carrier to the other of said drive shaft means,
(9) whereby said differential unit is operative to transmit torque to said drive shaft means from said prime mover independently, simultaneously, differentially, and in opposite directions,
(10) second clutch means adjacent said ground engaging means of said second axle and operative to engage and disengage said ground engaging means from said drive shaft means,

(11) and selectively operable means for effecting operation of each of said clutch means,
 (a) said selectively operable means being positioned remotely from said clutch means.

References Cited by the Examiner

UNITED STATES PATENTS

| | | | |
|---|---|---|---|
| 915,827 | 3/1909 | Brockett | 74—713 |
| 1,258,126 | 3/1918 | Leadbetter | 180—44 |
| 1,476,413 | 12/1923 | Norqual | 180—44 |
| 1,523,613 | 1/1925 | Sharpneck | 180—44 |
| 1,973,837 | 9/1934 | Youngren | 180—75 |
| 2,242,605 | 5/1941 | Casner | 74—713 |
| 2,771,791 | 11/1956 | Backman | 180—44 |
| 2,802,542 | 8/1957 | Gerst | 180—75 |

FOREIGN PATENTS

| | | |
|---|---|---|
| 1,149,279 | 12/1957 | France. |
| 883,843 | 7/1953 | Germany. |

A. HARRY LEVY, *Primary Examiner.*